(12) United States Patent
Rosenstock et al.

(10) Patent No.: US 8,228,570 B2
(45) Date of Patent: Jul. 24, 2012

(54) PROCESS AND APPARATUS FOR SCANNING IMAGED STORAGE PLATES AND HAVING AUTOMATIC GAIN ADJUSTMENT

(75) Inventors: Yehuda Rosenstock, Freeport, NY (US); Edward Yee, Brooklyn, NY (US)

(73) Assignee: Air Techniques, Inc., Melville, NY (US)

( * ) Notice: Subject to any disclaimer, the term of this patent is extended or adjusted under 35 U.S.C. 154(b) by 891 days.

(21) Appl. No.: 12/228,122

(22) Filed: Aug. 11, 2008

(65) Prior Publication Data
US 2009/0190191 A1    Jul. 30, 2009

Related U.S. Application Data

(60) Provisional application No. 61/062,496, filed on Jan. 28, 2008.

(51) Int. Cl.
*H04N 1/00* (2006.01)
*H04N 1/04* (2006.01)
*G06K 9/00* (2006.01)

(52) U.S. Cl. .................. 358/497; 358/426.05; 382/131; 382/132

(58) Field of Classification Search .................. 358/497, 358/1.16, 404, 444, 426.05, 471, 447, 448, 358/482, 484, 296; 382/131, 132, 129, 128
See application file for complete search history.

(56) References Cited

U.S. PATENT DOCUMENTS

| | | | | |
|---|---|---|---|---|
| 6,829,389 B1 * | 12/2004 | Arakawa et al. | | 382/218 |
| 6,934,590 B2 * | 8/2005 | Ogawa | | 700/19 |
| 2004/0245447 A1 * | 12/2004 | Karasawa | | 250/252.1 |
| 2009/0190191 A1 * | 7/2009 | Rosenstock et al. | | 358/497 |

* cited by examiner

*Primary Examiner* — Jerome Grant, II
(74) *Attorney, Agent, or Firm* — Gerald T. Bodner

(57) ABSTRACT

There is disclosed a process and apparatus for scanning imaged storage photo-stimuable phosphor plates including automatic gain capabilities once scanning of the thus imaged plate is initiated permitting preliminary reading of a portion of the storage foil or photo-stimuable phosphor imaging plate to determine pixel values for evaluation within a predetermined range, and adjusting the gain if such pixel value is outside the predetermined range by modifying the high voltage supply setting and thence to complete generation of a computer stored image having maximum depth of field.

11 Claims, 2 Drawing Sheets

PROCESS AND APPARATUS FOR SCANNING IMAGED STORAGE PLATES AND HAVING AUTOMATIC GAIN ADJUSTMENT

RELATED APPLICATION

This application claims the benefit of Provisional Application Serial No. 61/062,496, filed Jan. 28, 2008.

BACKGROUND OF THE INVENTION

1. Field of the Invention

This invention relates to the scanning of imaged storage photo-stimuable phosphor plates, and more particularly to a process and apparatus for scanning imaged storage photo-stimuable phosphor plates and provided with automatic gain adjustment to consistently produce computer stored images of acceptable clarity.

2. Description of the Prior Art

Traditional x-ray imaging systems using silver-based films are being replaced by radiographic imaging systems using photo-stimuable phosphor imaging films or substrates eliminating the need for physical storage of the imaged film since digital retrieval of the image information includes input and computer storage permitting viewing of such information on a viewer, such as CRT tube assembly. Additionally, such computer stored image information permits facile electronic transmission to any location obviating physical transfer of the imaging film.

When ionizing radiation or x-rays impinge on such foils or photo-stimuable phosphor imaging plates, metastable storage centers are produced, which are lattice defects or color centers which have trapped a charge carrier (electron) produced by the ionizing radiation. Such storage centers are stable over long periods of time. If the storage centers are illuminated with a narrow laser beam of corresponding wave length, the storage centers will be moved into a higher excited state, from which the charge carriers can recombine with the emission of light referred to as photo-stimuable luminescence. The latter process is also referred to as the recombination of storage centers.

At such points of the storage foil or photo-stimuable phosphor imaging plate, whereon a larger amount of x-rays has impinged, one obtains by reading this point using a reading light beam, a higher amount of light quanta than at such points which have received only a few x-rays. If the storage foil or photo-stimuable phosphor imaging plate is scanned in two dimensions, the output signals of a light detector receiving the photo-stimulated luminescence corresponding to the optical density of a conventional x-ray film. In a reading device, such as a scanner, two dimensional scanning of the storage foils is obtained by arranging the storage foil or photo-stimuable phosphor imaging plate on the outer surface of a drum, and moving a reading unit along a generating line of the drum.

In U.S. Pat. No. 6,599,004 to Thoms, there is disclosed a apparatus for reading flexible storage foils wherein the flexible storage film having image-wise projected information is positioned on a cylindrically-shaped surface and is caused to be linearly moved while being interrogated or scanned via a slot by a light beam generated in a helical line in a continuous manner from a point disposed at the axis of the cylindrically-shaped surface. At the conclusion of the reading process, the flexible storage film is caused to be returned to its starting position with the thus read storage film being thereafter separately processed to remove any latent image by exposure to light to cause trapped charged electrons to be dissipated thereby restoring the storage film for use in a subsequent receiving projected imaging information process. In the event that the thus produced image is vague, faded or not as detailed as desired, the imaged plate may be reprocessed in the apparatus with gain adjustments to achieve the desired clarity.

In U.S. Pat. No. 6,762,430 to Alzner, et al. and assigned to the same assignee as the present invention, hereby incorporated by reference, there is described a plate guide system for dental imaging plates for use in the hereinabove described apparatus of U.S. Pat. No. '014 to Thoms. Following scanning, the imaged plate is further passed through an erasing assembly whereby the imaging capability is thereby restored. In the event that the resulting image is vague, faded or is not as detailed as desired, the once exposed area of the patient must be x-rayed and the thus produced imaged storage plate is again scanned at an appropriate gain level.

OBJECTS OF THE PRESENT INVENTION

An object of the present invention is to provide a process and apparatus for scanning imaged storage plates and having automatic gain capabilities.

Yet another object of the present invention is to provide a process and apparatus for scanning imaged storage plates and having automatic gain capabilities to consistently provide scanned images of improved clarity and definition.

Still another object of the present invention is to provide a process and apparatus for scanning imaged storage plates and having automatic gain capabilities obviating further re-scanning requirements.

Yet still another object of the present invention is to provide a process and apparatus for scanning imaged storage plates and having automatic gain capabilities permitting of facile processing.

SUMMARY OF THE PRESENT INVENTION

These and other objects of the present invention are achieved by a process and apparatus for scanning imaged storage photo-stimuable phosphor plates including automatic gain capabilities once scanning of the thus imaged plate is initiated permitting preliminary reading of a portion of the storage foil or photo-stimuable phosphor imaging plate to determine pixel values for evaluation within a predetermined range, and adjusting the gain if such pixel value is outside the predetermined range by modifying the high voltage setting thereby to complete generation of a computer stored image having maximum depth of field.

BRIEF DESCRIPTION OF THE DRAWINGS

These and other objects of the present invention will become more readily apparent from the following detailed description thereof, when taken with the accompanying drawings wherein.

DETAILED DESCRIPTION OF THE INVENTION

Figure 1:
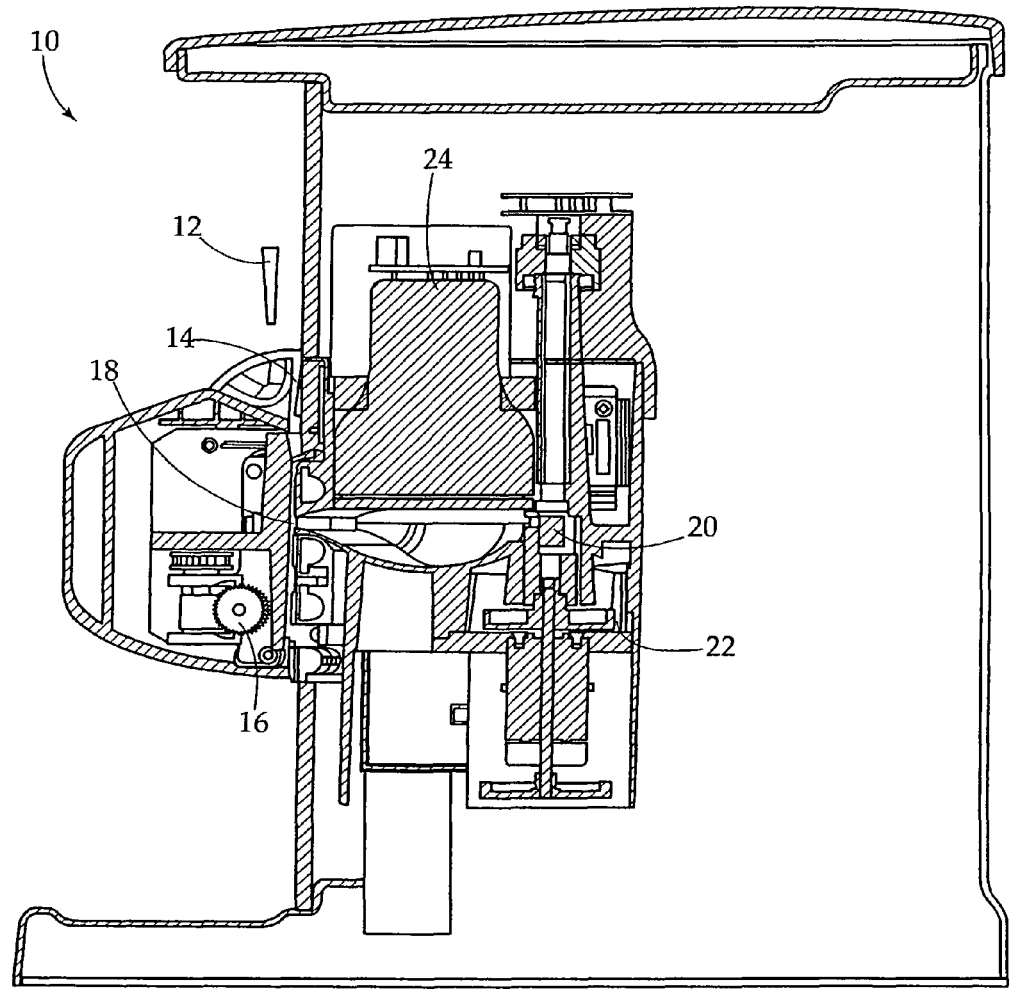
FIG. 1 is a cross-sectional view of a scanner assembly.

Referring now to the drawings, and more particularly to FIG. 1, there is illustrated a scanner assembly, generally indicated as 10, comprised of a plate guide member 12 including a slot 14 for directing an imaged storage plate towards a transportation belt assembly 16 driven by roller members 18. The scanner assembly 10 is provided with a reading slot 20 for interrogation by a laser beam 22 and a position encoder 22.

Figure 2:
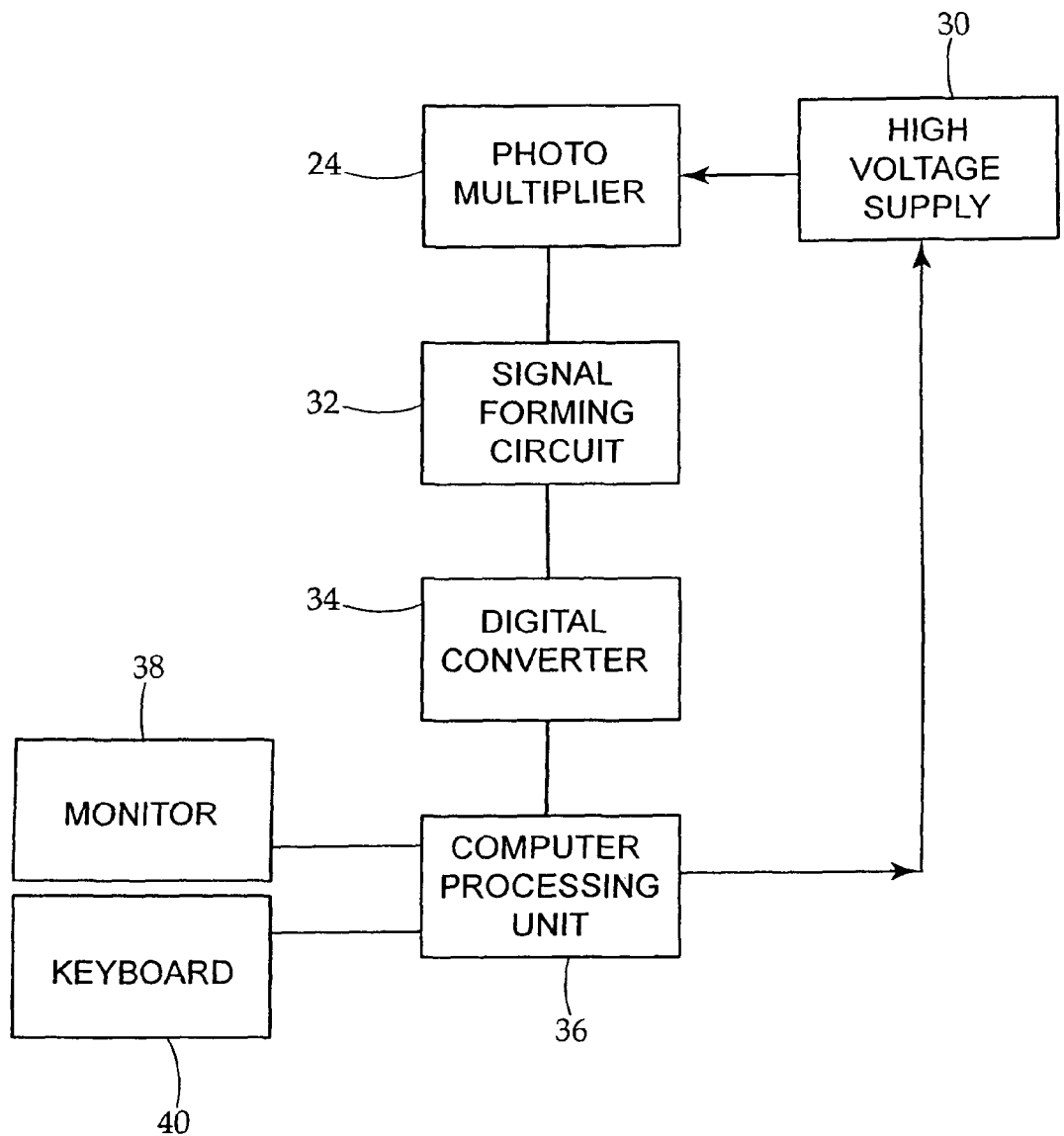
FIG. 2 is a schematic view of the circuitry for the scanner assembly for maximizing image quality.

Positioned proximate the position encoder 22, there is provided a photo-multiplier 24 to record the thus produced luminescence energized by a controllable high voltage supply 30 referring now to FIG. 2.

A signal forming circuit 32 is connected to the photo multiplier 24 for shaping, amplifying and filtering the output signal and sending a digitalized signal to a digital converter 34. The digital converter 34 analyzes such signal for transmission to a computer processing unit (CPU) 36 suitably connected to a monitor 38 and a keyboard 40. Software is incorporated into the CPU 36 to permit analysis and evaluation against a predetermined acceptable range for such a signal and thereby adjust the high voltage supply 30, should the signal be outside the predetermined acceptable range thereby to change the gain of the scanner assembly 10 by modifying the high voltage setting 30 to the photo-multiplier 24, which after proper resetting permits continued scanning of the imaged storage plate to the end whereupon the full image is now created viewable on the monitor 38. Automatic gain adjustment to the high voltage 30 may be effected during scanning at any time during scanning for further enhancement of the gain adjustment.

In operation, the scanner assembly 10 is activated and an imaged photo-stimuable storage plate 12, referring again to FIG. 1, is inserted through the slot 14 of a plate guide member 12 whereupon, the transportation belt assembly 16 engages such storage plate 12 to effect transit thereof passed the reading slot 20 while being interrogated by the laser beam 22. As hereinabove discussed, the laser beam 20 energizes the storage centers causing emission of photo-stimuable luminescent light. The thus produced luminescent light is recognized by the output signals of the position encoder 22 and recorded by the photo-multiplier 24 thereby providing an electronic image of the previously formed x-ray image controllable by the high voltage supply 30.

After a predetermine number of line scan, e.g. 50-100, an output signal from the photo-multiplier 24 is sent to the signal forming circuit 32 for shaping, amplifying and filtering and thence sent to the digital converter 34 for determining picture quality, such as by producing a pixel value. The pixel value is thereupon sent to the CPU 36 wherein under the control of a software program, such pixel value is compared with the predetermined pixel value range. Should the pixel value be outside of the predetermined pixel value range, a signal is sent to the high voltage supply 30 to change the gain, as required, to the photo-multiplier 24 to permit continued scanning of the stored image thereby to create a full image viewable on the monitor 38.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

What is claimed is:

1. A process for retrieving information stored image-wise on a reusable storage film, which comprises the steps of:
    a.) transporting an image containing reusable storage film through a scanning zone;
    b.) interrogating said storage film with a light source to digitally generate photo-stimulated luminescent light, the luminescent light being recorded by a photo-multiplier;
    c.) analyzing said thus generated luminescent light after a predetermined number of line scans to determine image quality;
    d.) evaluating said partially scanned image against predetermined image requirements; and
    e.) adjusting a gain of said photo-multiplier, if required, for continued generation of photo-stimulated luminescent light from said storage film thereby to produce an acceptable image.

2. The process for retrieving information stored image-wise on a reusable storage film as defined in claim 1 wherein the predetermined number of line scans in step b.) is from 50-100 lines.

3. The process for retrieving information stored image-wise on a reusable storage film as defined in claim 1 wherein step c.) analysis is of a pixel value of said partially scanned image.

4. The process for retrieving information stored image-wise on a reusable storage film as defined in claim 1 wherein said predetermined image requirements are defined by a pixel range value included in a computer processing unit.

5. The process for retrieving information stored image-wise on a reusable storage film as defined in claim 4 wherein said computer processing unit controls the gain of the photo-multiplier.

6. An apparatus for retrieving information stored image-wise on a reusable storage film, which comprises:
    means for interrogating said image on said reusable storage film and thereby generating a photo-stimulated luminescent light:
    means for transporting said reusable storage film through said interrogating means;
    means for recording the photo-stimulated luminescent light;
    means for evaluating image quality after a predetermined number of line scans of said imaged reusable storage film; and
    means for adjusting a gain of said means for recording the photo-stimulated luminescent light following the predetermined number of line scans prior to completion of interrogating.

7. The apparatus for retrieving information stored image-wise on a reusable storage film as defined in claim 6 wherein the predetermined number of line scans is from 50-100 lines.

8. The apparatus for retrieving information stored image-wise on a reusable storage film as defined in claim 6 wherein said signal means for evaluating image quality determines image quality as a function of pixel value.

9. The apparatus for retrieving information stored image-wise on a reusable storage film as defined in claim 6 wherein said means for evaluating image quality includes a programmed computer processing unit.

10. The apparatus for retrieving information stored image-wise on a reusable storage film as defined in claim 9 and further including a monitor and keyboard connected to said computer processing unit.

11. A process for retrieving information stored image-wise on a reusable storage film, which comprises the steps of:
    a.) transporting an image containing reusable storage film through a scanning zone;
    b.) interrogating said storage film with a light source to digitally generate photo-stimulated luminescent light, the luminescent light being recorded by a photo-multiplier;
    c.) analyzing said thus generated luminescent light after a predetermined number of line scans to determine image quality; d.) evaluating said partially scanned image against predetermined image requirements; and e.) adjusting a high voltage supply to said photo-multiplier, if required, for continued generation of photo-stimulated luminescent light from said storage film thereby to produce an acceptable image;

wherein said predetermined image requirements are defined by a pixel range value included in a computer processing unit; and wherein said computer processing unit controls said high voltage supply.

* * * * *